US009639134B2

(12) United States Patent
Gendler

(10) Patent No.: US 9,639,134 B2
(45) Date of Patent: May 2, 2017

(54) METHOD AND APPARATUS TO PROVIDE TELEMETRY DATA TO A POWER CONTROLLER OF A PROCESSOR

(71) Applicant: Intel Corporation, Santa Clara, CA (US)

(72) Inventor: Alexander Gendler, Kiriat Motzkin (IL)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 14/614,712

(22) Filed: Feb. 5, 2015

(65) Prior Publication Data

US 2016/0231798 A1 Aug. 11, 2016

(51) Int. Cl.
*G06F 1/26* (2006.01)
*G06F 1/32* (2006.01)

(52) U.S. Cl.
CPC ............ *G06F 1/3203* (2013.01); *G06F 1/324* (2013.01); *G06F 1/3206* (2013.01); *G06F 1/3296* (2013.01)

(58) Field of Classification Search
CPC ...... G06F 1/3203; G06F 1/3206; G06F 1/324; G06F 1/3296
USPC .................................................. 713/320, 323
See application file for complete search history.

(56) References Cited

U.S. PATENT DOCUMENTS

| 5,163,153 | A | | 11/1992 | Cole et al. |
| 5,485,150 | A | * | 1/1996 | Hisanaga ............... G01D 4/006 340/870.02 |
| 5,522,087 | A | | 5/1996 | Hsiang |
| 5,590,341 | A | | 12/1996 | Matter |
| 5,621,250 | A | | 4/1997 | Kim |
| 5,931,950 | A | | 8/1999 | Hsu |
| 6,185,454 | B1 | * | 2/2001 | Thompson ............... A61N 1/36 607/2 |
| 6,738,670 | B1 | * | 5/2004 | Almendinger ....... A61B 5/0031 607/32 |
| 6,748,546 | B1 | | 6/2004 | Mirov et al. |
| 6,792,392 | B1 | | 9/2004 | Knight |
| 6,823,516 | B1 | | 11/2004 | Cooper |
| 6,829,713 | B2 | | 12/2004 | Cooper et al. |
| 6,996,728 | B2 | | 2/2006 | Singh |
| 7,010,708 | B2 | | 3/2006 | Ma |

(Continued)

FOREIGN PATENT DOCUMENTS

EP 1 282 030 A1 5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 Pages.

(Continued)

*Primary Examiner* — Chun Cao
(74) *Attorney, Agent, or Firm* — Trop, Pruner & Hu, P.C.

(57) ABSTRACT

In an embodiment, a processor includes a plurality of cores including a first core. The first core includes a first plurality of accumulator logics, each accumulator logic of the first plurality of accumulator logics to store corresponding first core telemetry data. The processor also includes a power management unit (PMU) to request telemetry data from the first core and in response to receive the first core telemetry data stored in at least one accumulator logic of the first plurality of accumulator logics. Other embodiments are described and claimed.

20 Claims, 19 Drawing Sheets

(56) References Cited

U.S. PATENT DOCUMENTS

| | | | |
|---|---|---|---|
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0198863 A1* | 8/2007 | Bose | G06F 1/206 713/300 |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2009/0271141 A1* | 10/2009 | Coskun | G06F 1/206 702/132 |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0154090 A1 | 6/2011 | Dixon et al. | |
| 2012/0054503 A1* | 3/2012 | Hsiao | G06F 1/3206 713/300 |
| 2012/0079290 A1 | 3/2012 | Kumar | |
| 2012/0246506 A1 | 9/2012 | Knight | |
| 2013/0061064 A1 | 3/2013 | Ananthakrishnan et al. | |
| 2013/0080803 A1 | 3/2013 | Ananthakrishnan et al. | |
| 2013/0080804 A1 | 3/2013 | Ananthakrishan et al. | |
| 2013/0111120 A1 | 5/2013 | Ananthakrishnan et al. | |
| 2013/0111121 A1 | 5/2013 | Ananthakrishnan et al. | |
| 2013/0111226 A1 | 5/2013 | Ananthakrishnan et al. | |
| 2013/0111236 A1 | 5/2013 | Ananthakrishnan et al. | |
| 2013/0346774 A1 | 12/2013 | Bhandaru et al. | |
| 2014/0068290 A1 | 3/2014 | Bhandaru et al. | |
| 2014/0195829 A1 | 7/2014 | Bhandaru et al. | |
| 2014/0208141 A1 | 7/2014 | Bhandaru et al. | |
| 2016/0091954 A1* | 3/2016 | de La Cropte De Chanterac | G06F 1/3234 713/322 |

OTHER PUBLICATIONS

SPEC-Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

John Blyler, "On-Chip Interconnection IP Gains Attention", Sep. 9, 2011, pp. 1-2, Embedded Intel.

* cited by examiner

US 9,639,134 B2

METHOD AND APPARATUS TO PROVIDE TELEMETRY DATA TO A POWER CONTROLLER OF A PROCESSOR

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Figure 1:
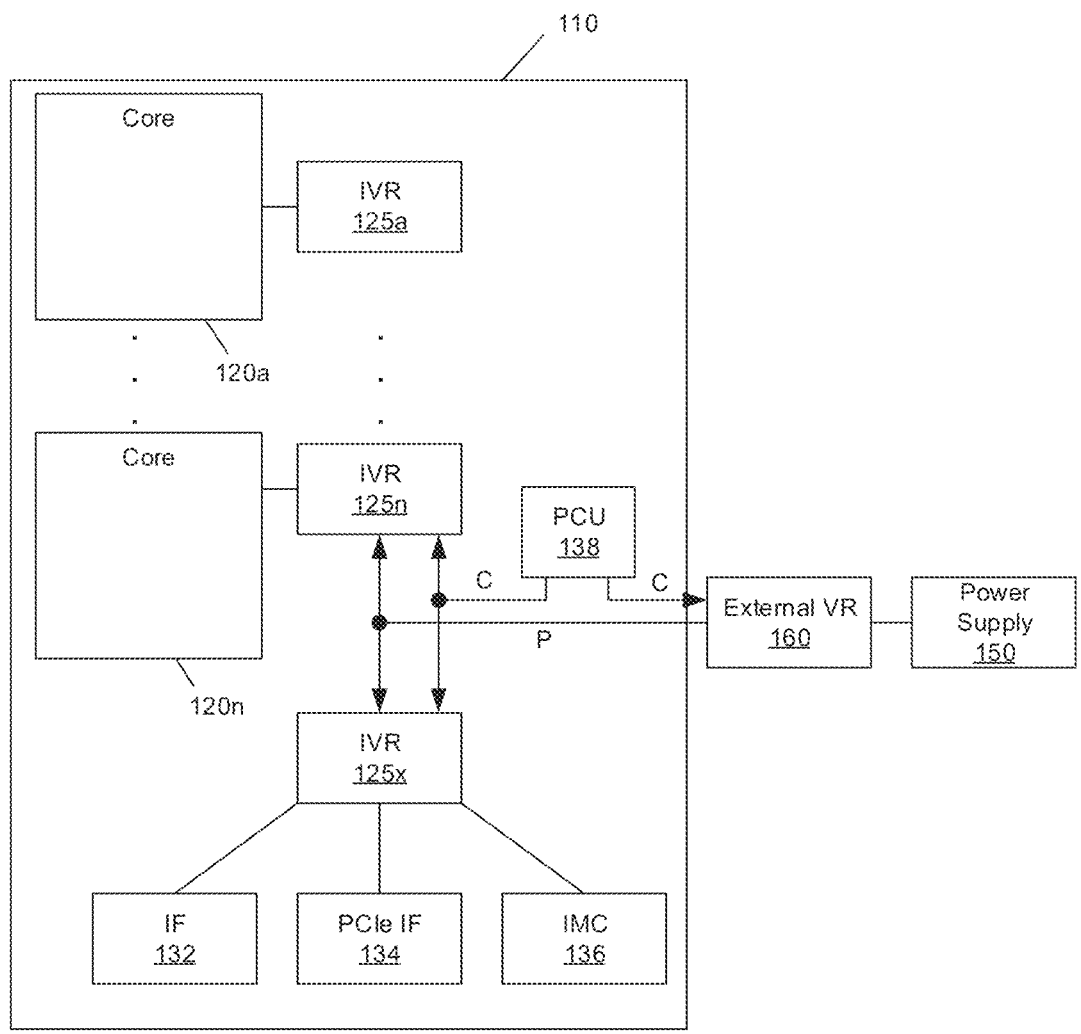
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software).

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
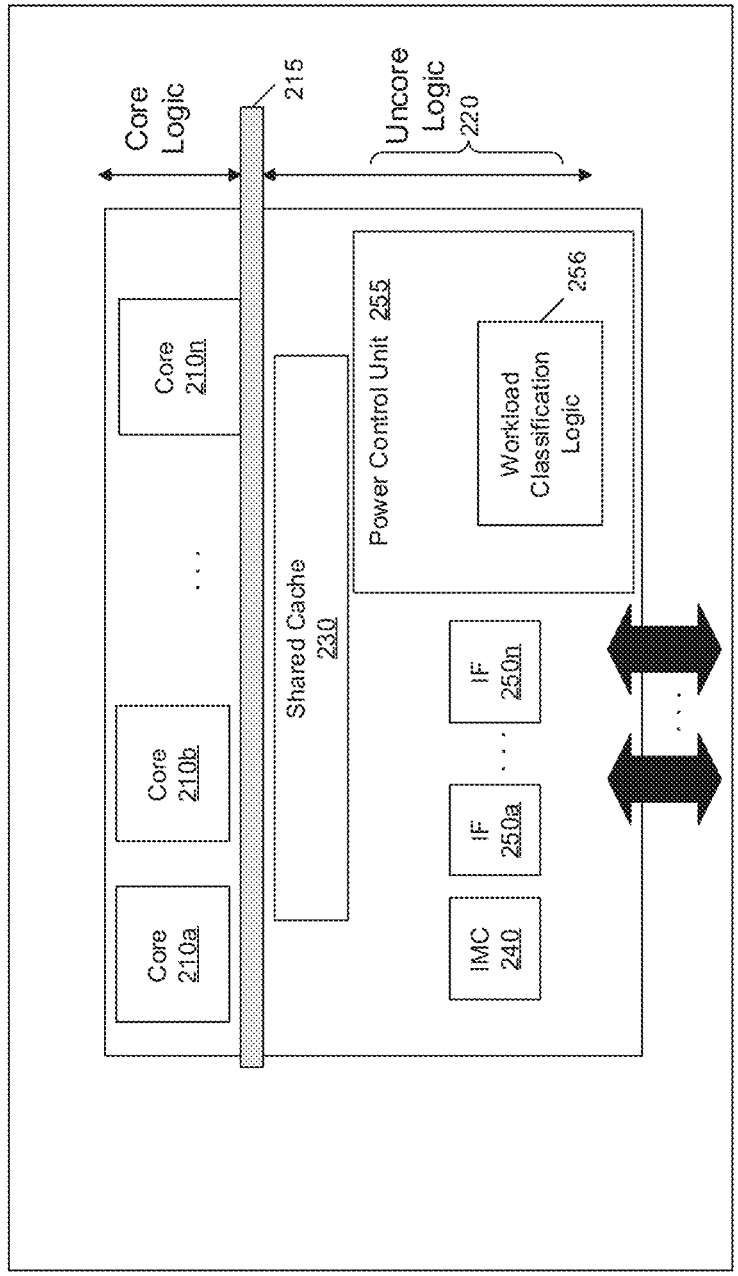
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
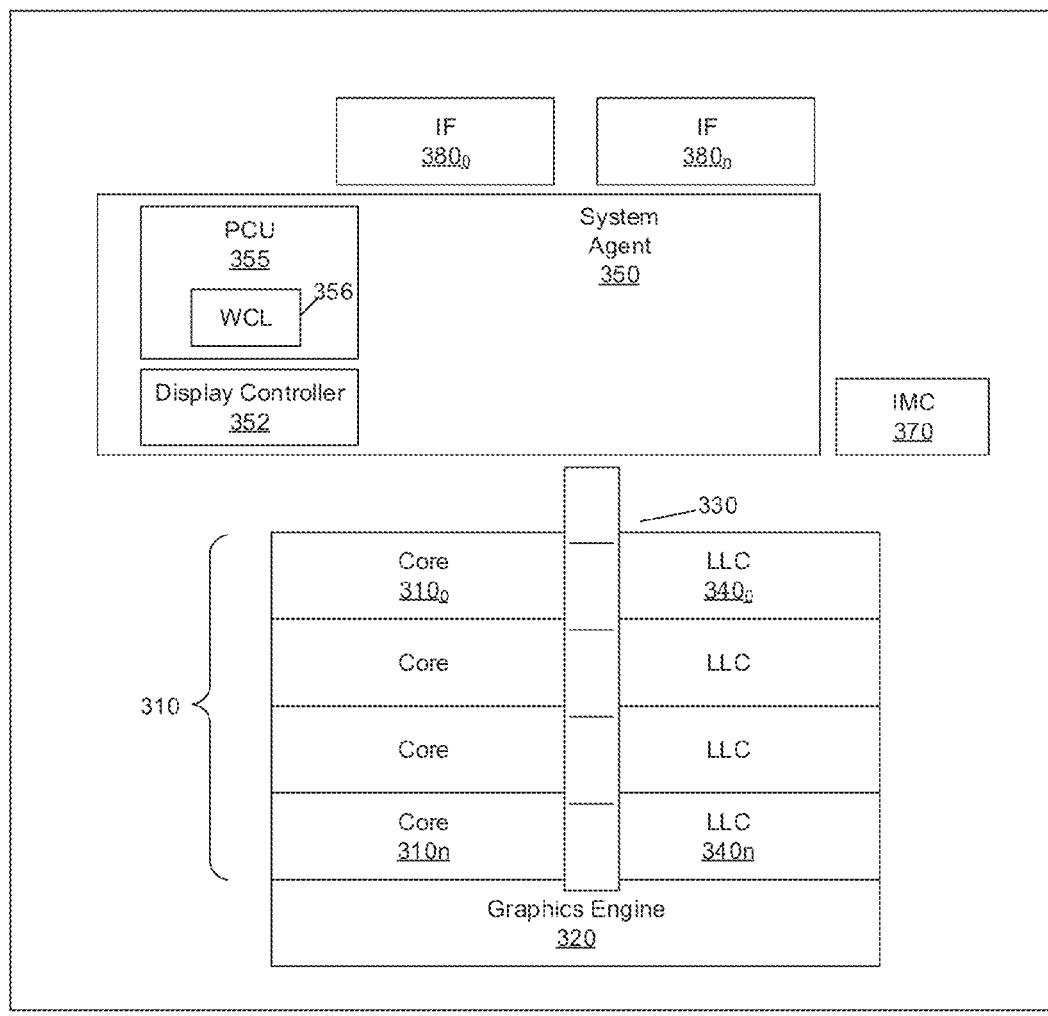
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. As further seen, system agent domain 350 may include a power control unit 355 which can include logic to perform the power management techniques described herein.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
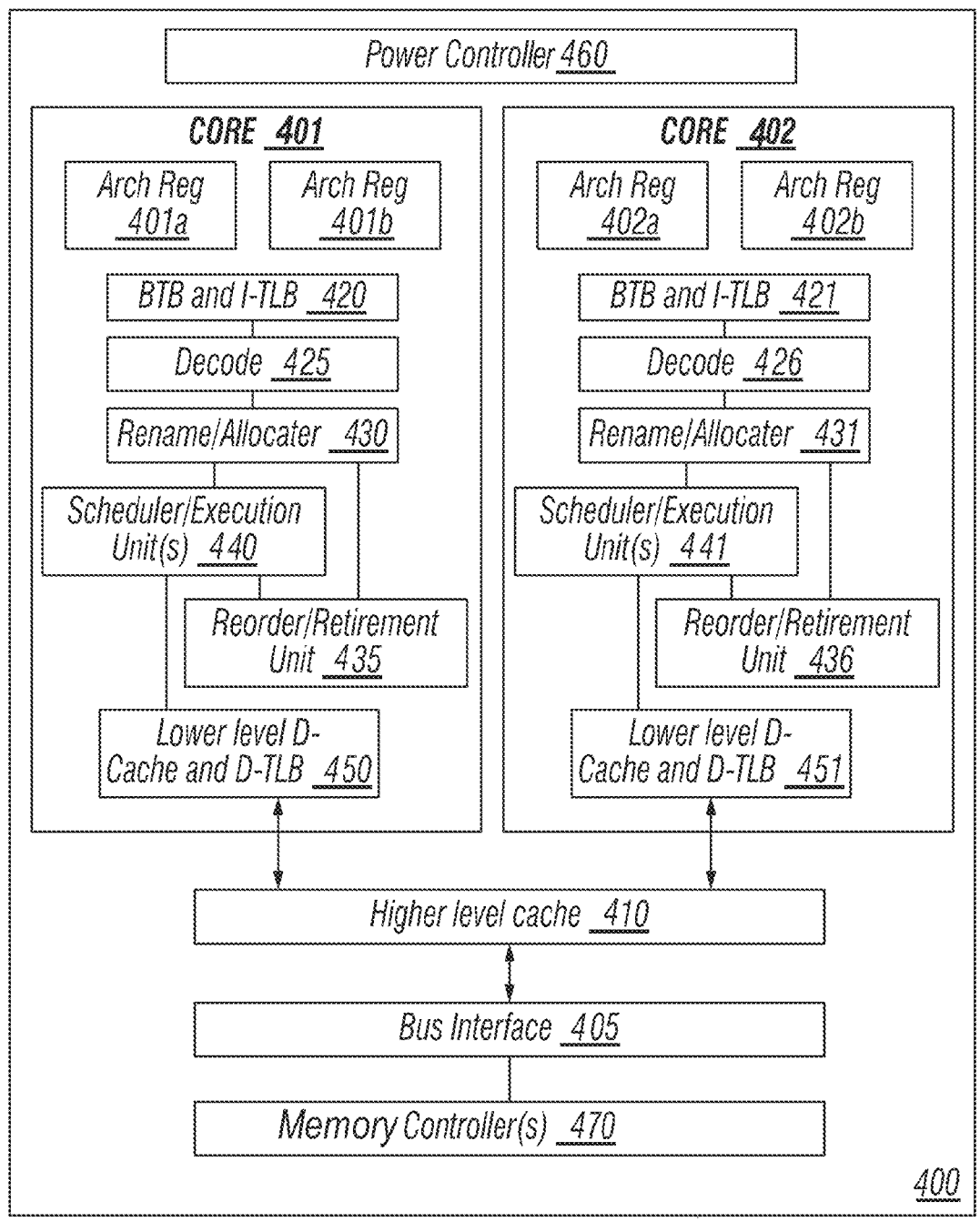
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
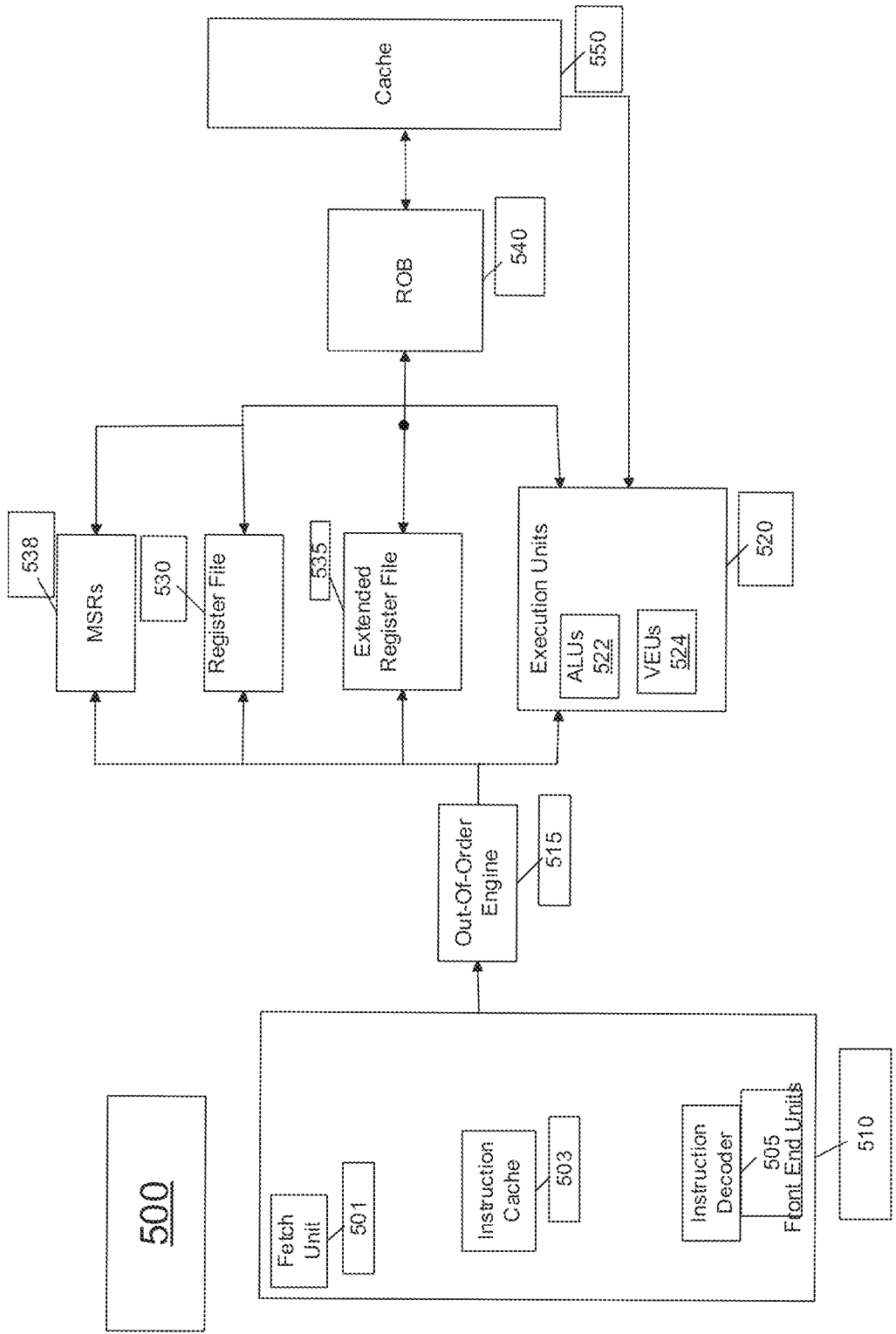
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. For purposes of configuration, control, and additional operations, a set of machine specific registers (MSRs) 538 may also be present and accessible to various logic within core 500 (and external to the core). For example, power limit information may be stored in one or more MSR and be dynamically updated as described herein.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
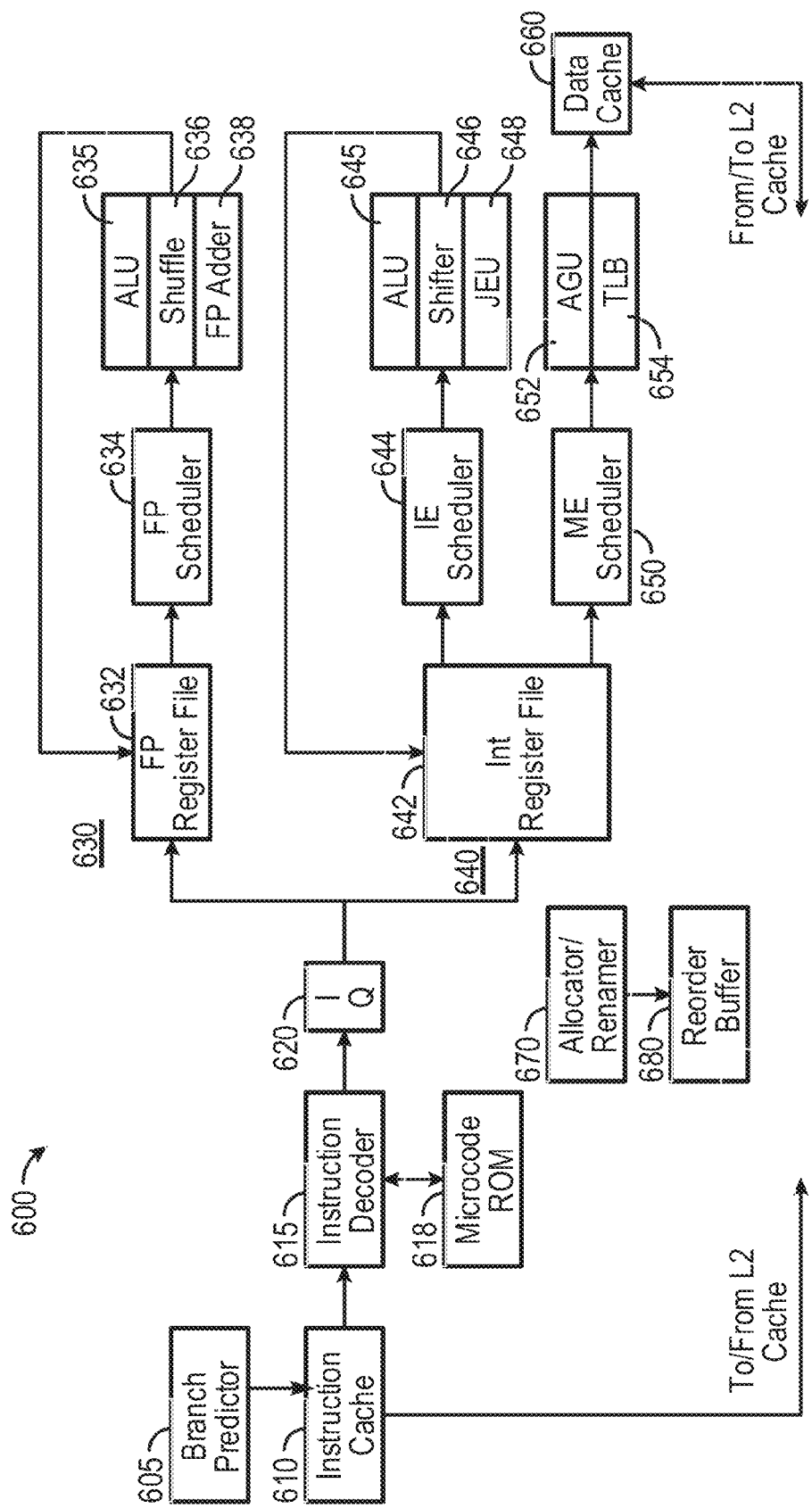
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
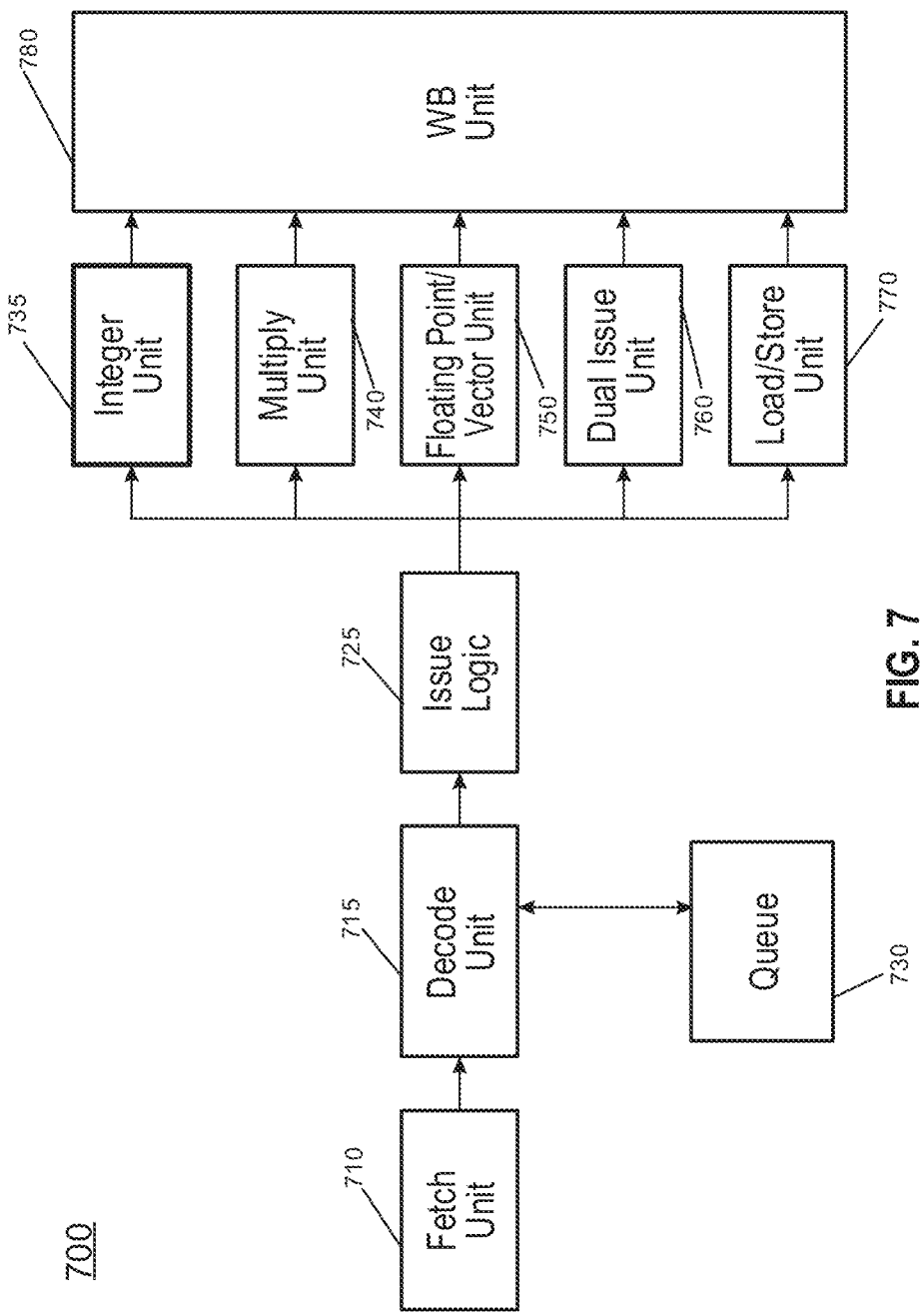
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
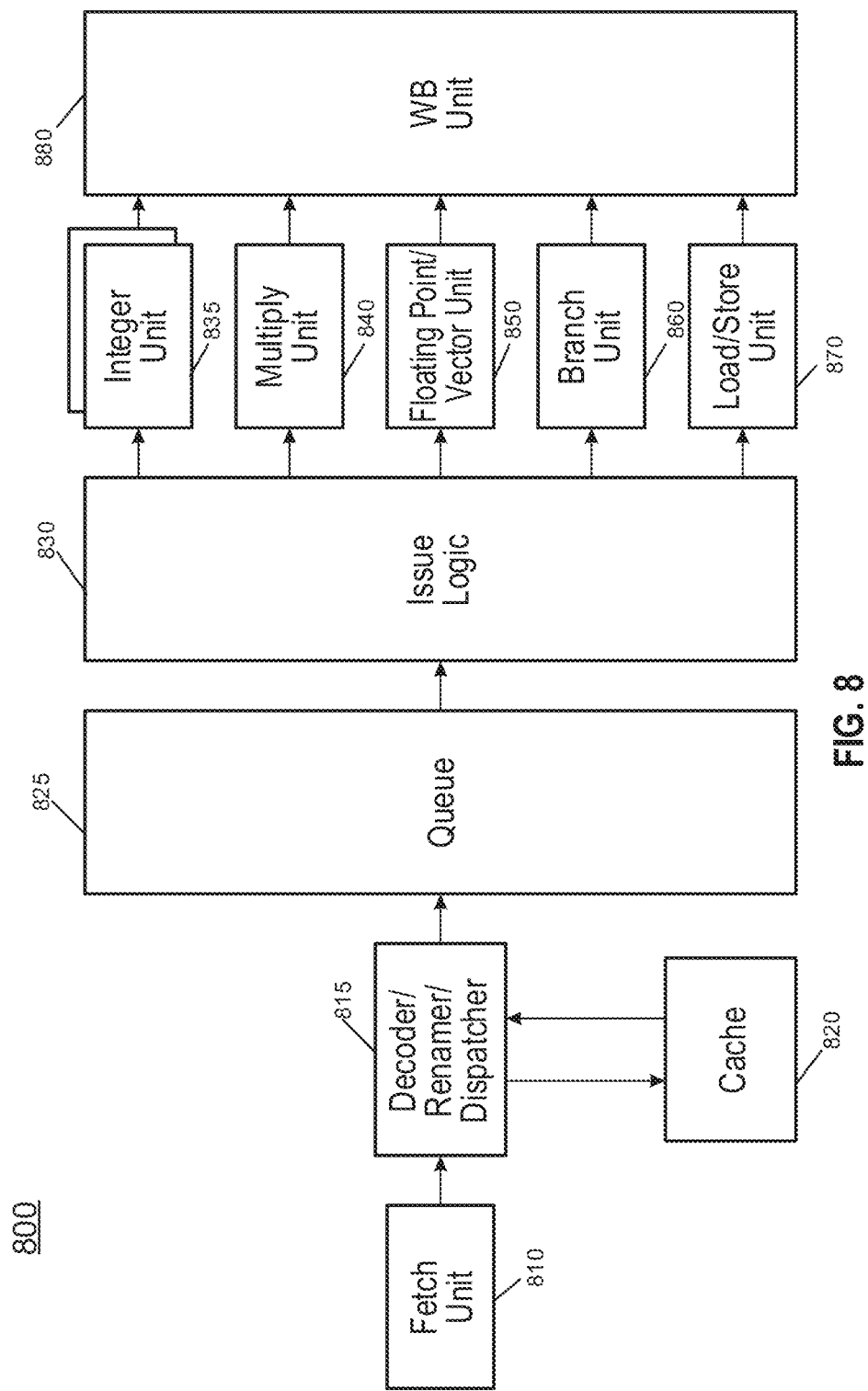
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
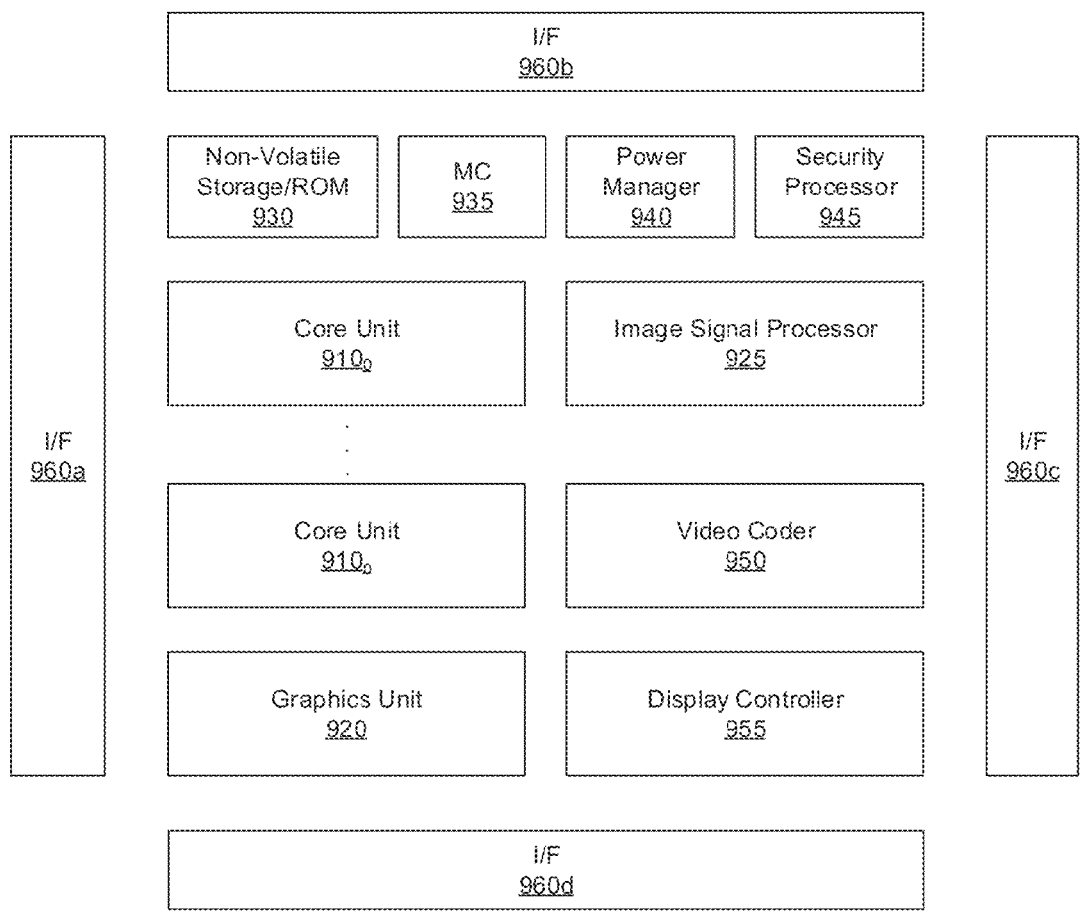
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations such as secure boot operations, various cryptography operations and so forth.

Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
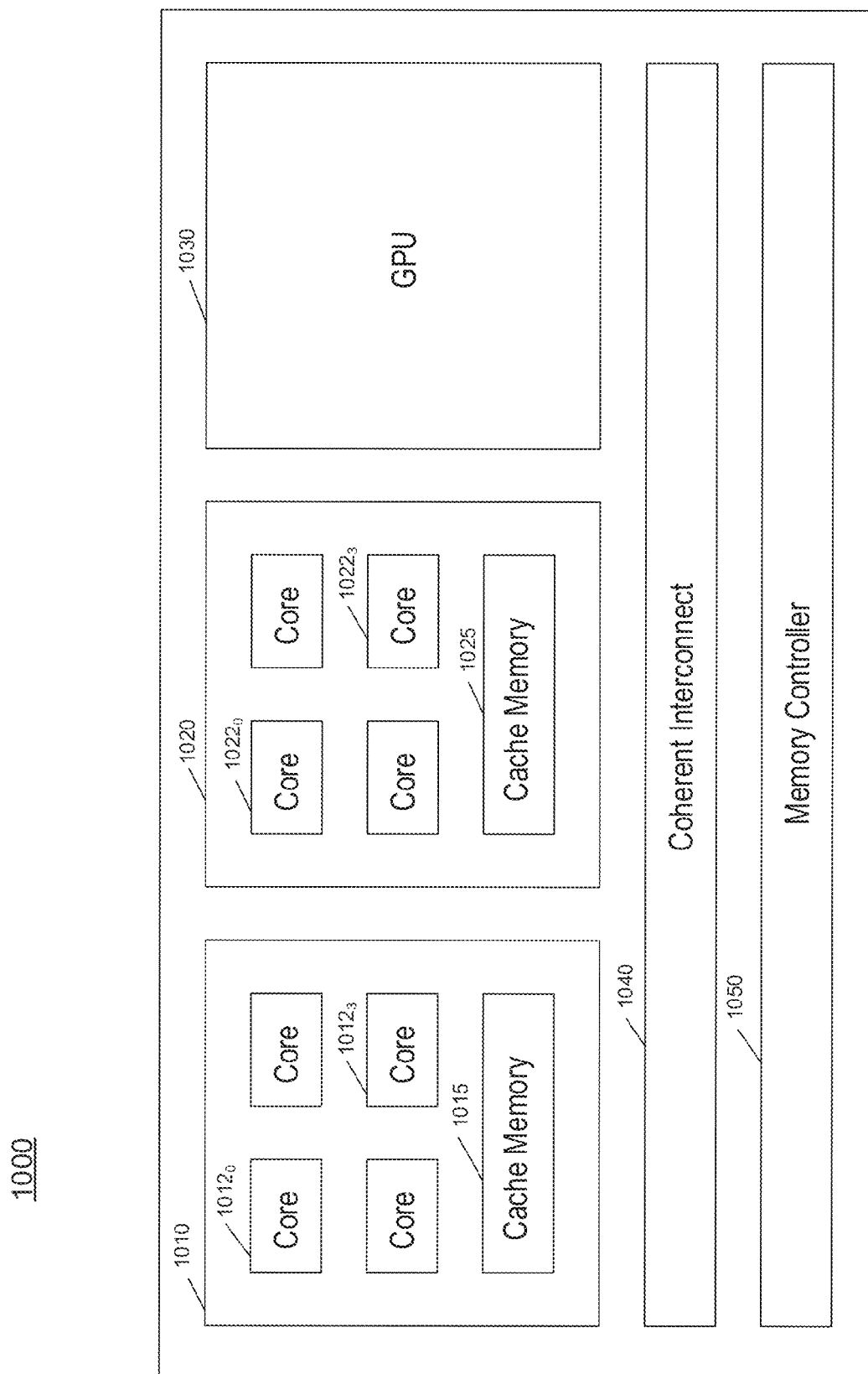
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
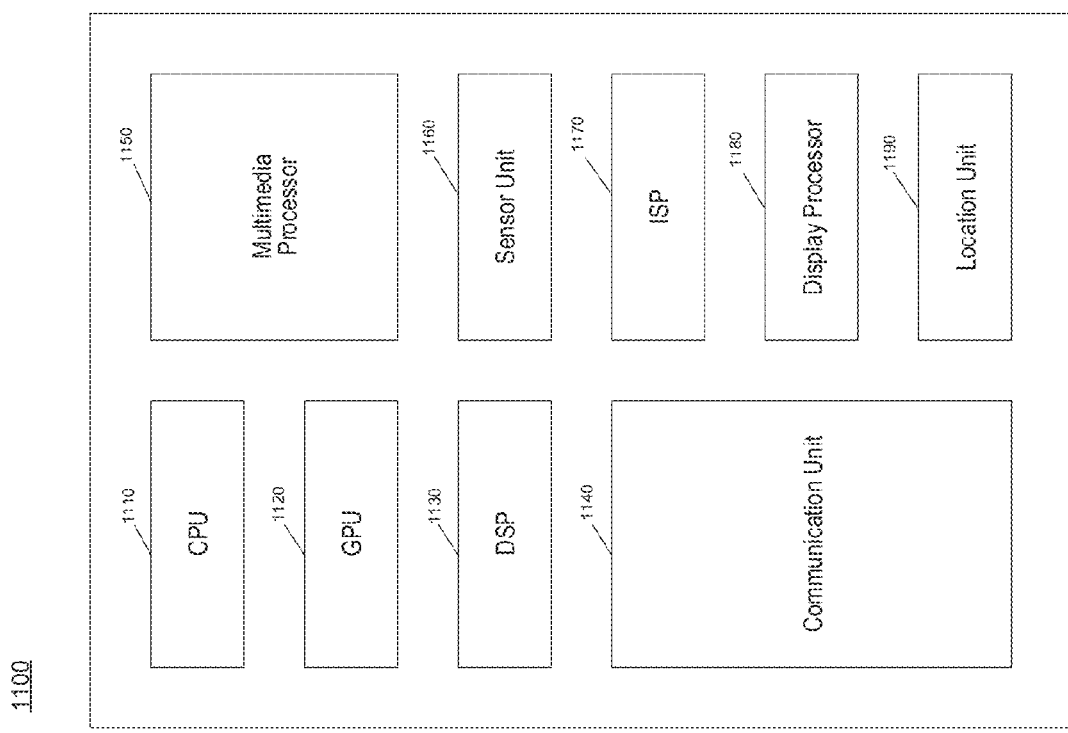
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
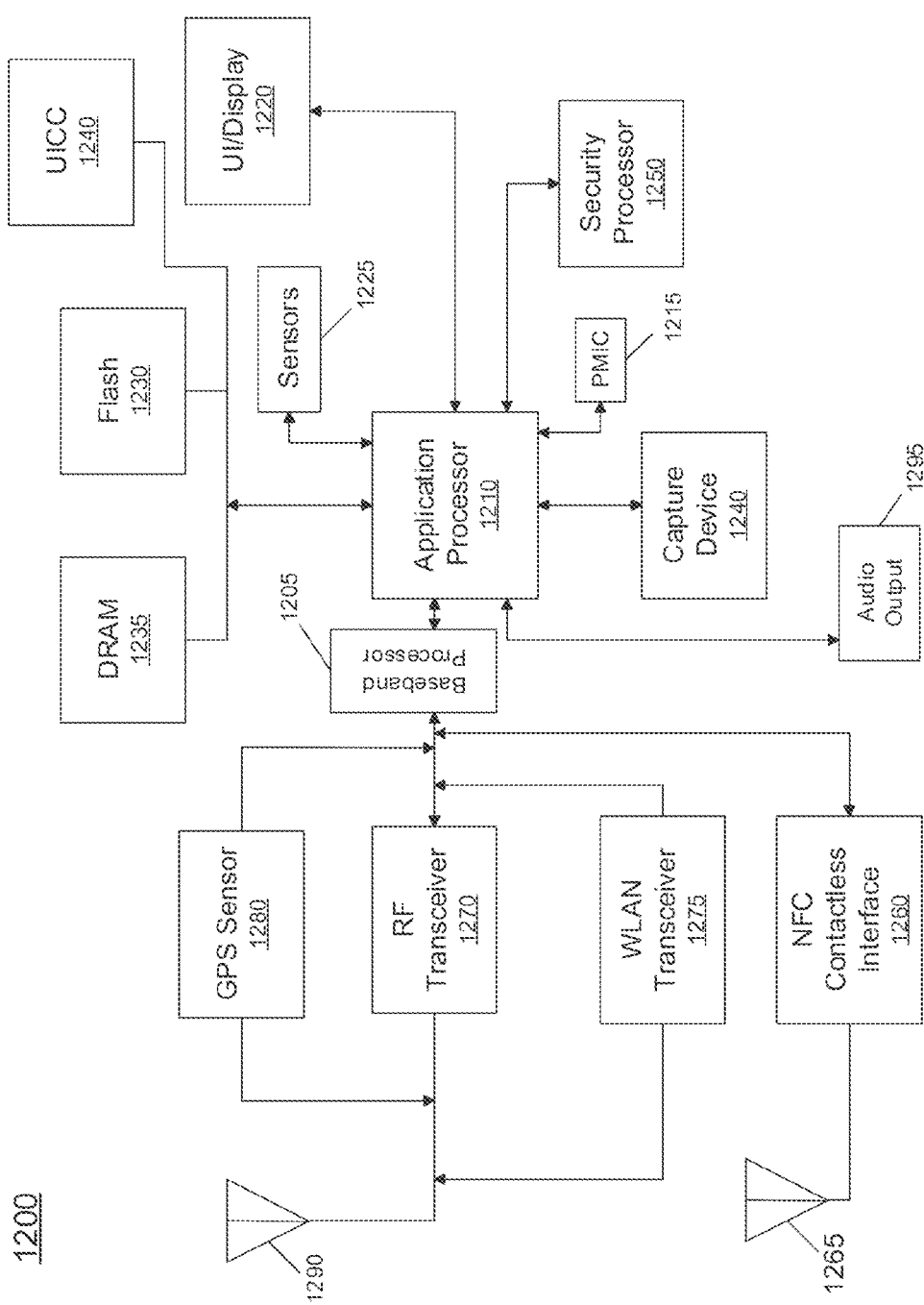
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
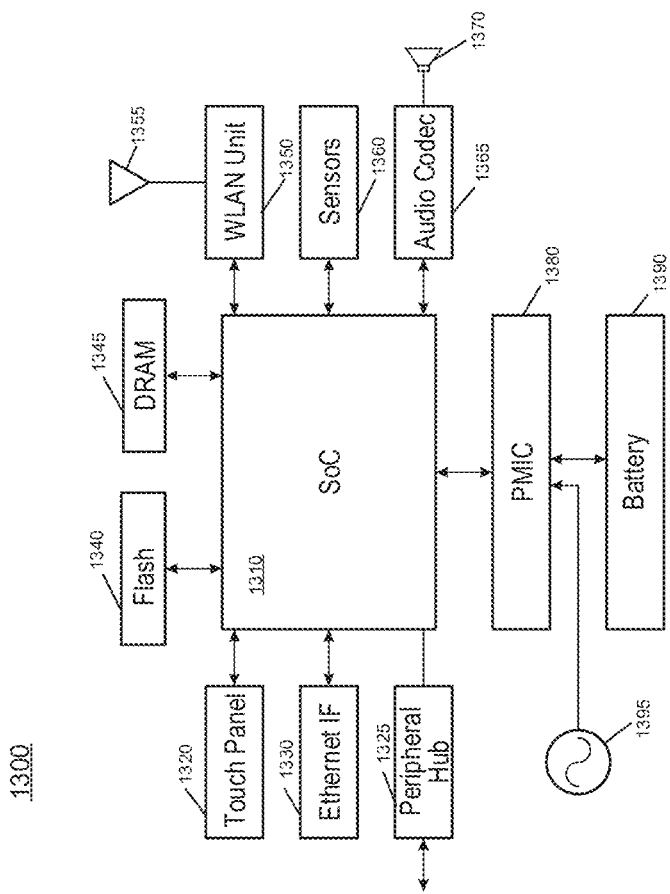
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
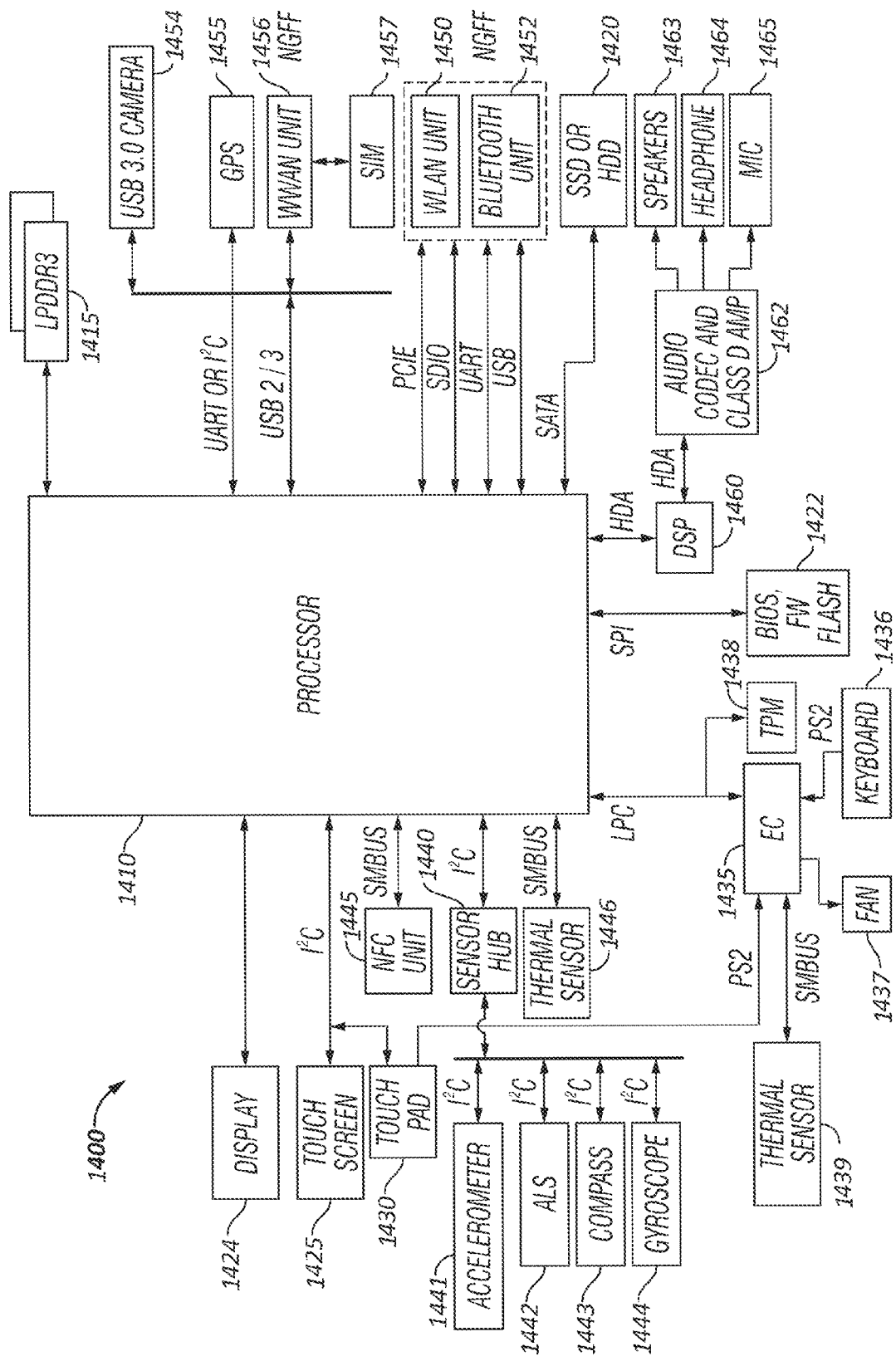
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an $I^2C$ interconnect. As further shown in FIG. 14, in addition to touch screen 1425, user input by way of touch can also occur via a touch pad 1430 which may be configured within the chassis and may also be coupled to the same $I^2C$ interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an $I^2C$ interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
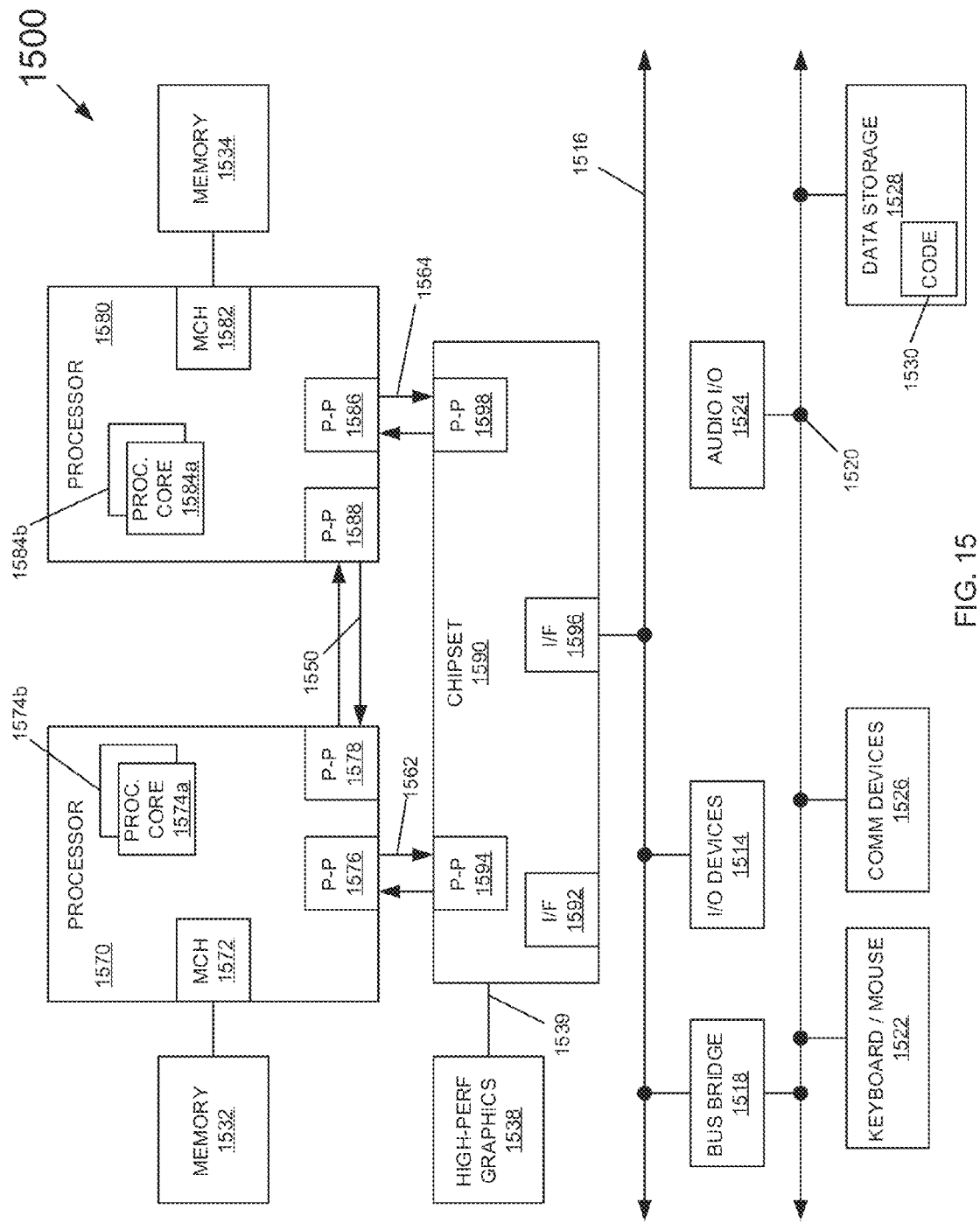
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

A processor, such as a multi-core processor, may have a power management unit (PMU) that can monitor telemetry data associated with power consumption of portions of the processor, e.g., the cores, one or more caches, interconnect, uncore, etc. The PMU may adjust power supplied to each of the components based on the telemetry data received.

For example, the telemetry data may include, for each core of a multi-core processor for a particular time period, an indication (also measurement herein) of an event occurrence or of multiple occurrences of the event. That is, for each type of event the telemetry data may include a corresponding value to indicate how many times the event has occurred (e.g., single bit value to indicate a single instance of the event, or a multi-bit value to indicate how many times the event has occurred between reports).

Events may include, but are not limited to: streaming single instruction multiple data instruction multiple data (SIMD) extension instructions (SSE 128, 256, 512 bit), fused multiply/add (FMA) instructions, mid-level cache lookup, data cache load/store dispatch, memory load/store, instruction decode, micro-operation allocation, branch predictor thread identification replace, out-of-order (OOO) thread select, power meter measurement, instances that the core is in an active state (e.g., C0 power state), instances of the core in a C1 power state, instances of the core in a C6 power state, detection of a current spike, e.g., via comparison of current slope (dI/dt) to a threshold value, energy efficiency count (e.g., a count of instances that misses occur that result in accesses to a dynamic random access memory (DRAM) due to a backlog at the OOO), and other events that may be measured on a periodic basis or on a continual basis.

Each measurement may be determined by a local counter. A cumulative count (also tally herein) for a time period between requests from the PMU may be stored in a corresponding accumulator (also accumulator logic herein).

Accumulators may be placed in the PMU to sum telemetry data that is to be received over successive periods and to store cumulative telemetry data, e.g., a sum of the data received over a defined time period. In order to maintain low error and low jitter rate of the cumulative telemetry data, the accumulators in the PMU may read the telemetry data at frequent intervals. Frequent reads to be received from each component may result in transport congestion in a link (e.g., a sideband path) used to transport the data, e.g., via an on-chip system fabric link (OSF).

If the accumulators are to be situated within the PMU, a "push" (e.g., initiation of transmission) of data by each local counter to the corresponding accumulator may be implemented. When the accumulators are situated in the PMU, each push of data from a local counter in the core via, e.g., a sideband path to a corresponding accumulator may occur after the corresponding counter measures its parameter value, e.g., each push is to occur after each measurement.

In embodiments, the accumulators to store telemetry data for one or more cores (or other elements of the processor) may be placed inside of the respective core (or other element of the processor). Infrastructure for the processor may include an accumulator per telemetry parameter in the core. Each accumulator may operate through use of VCC of the core and single frequency clock (e.g., a low frequency clock) of the core. The core to be monitored by the accumulators may include a power management agent (PMA), which may be implemented in hardware, software, firmware, or a combination thereof. The PMA may include logic to set operational parameters such as accumulator update rate (ACC_UPDATA_RATE) based on a corresponding parameter that may be stored into a control register (CR) of the PMA (e.g., by the PMU) and that may specify how often each accumulator is to be updated. The accumulator update rate may be selected to minimize jitter. In some embodiments the PMA is to operate in its own power domain that is distinct from the core, e.g., according to a different clock (e.g., the PMA may operate at a lower clock frequency than the core.

For example, in one embodiment, the PMA may operate with a clock frequency of approximately 100 MHz). Each accumulator may store a sum of the telemetry data provided by a corresponding local counter. The local counter may provide the telemetry data to its accumulator at a high frequency to maintain low jitter and high accuracy, while the accumulator may provide the summed data (cumulative telemetry data over an extended time period) to the PMU at a lower frequency (e.g., longer time interval between reports to the PMU), which can result in reduced data traffic within the side band path to the PMU.

In some embodiments, the PMA may include PMA CRs to store thresholds per telemetry parameter (Tele_Thres). For example, each PMA CR may specify a corresponding parameter threshold. When the accumulator value exceeds the parameter threshold, the PMA within the core may not wait for a "pull command" (e.g., request for the telemetry data issued by the PMU), but instead the PMA may push, to the PMU, the telemetry data in the accumulator whose value exceeds the corresponding parameter threshold. Such CRs may enable the PMA to recognize an occurrence of an event or a warning of an impending event associated with a telemetry data value that exceeds a corresponding threshold, and to notify the PCU upon recognition of the event or impending event.

In some embodiments, the PMU may include virtual wire CRs (Tele_Vir_Wire CR). If a threshold stored in one of the PMA CRs is exceeded, a value in the corresponding Tele_Vir_Wire CR may be set and may serve as a notification to the PMU of the corresponding event, which may cause the PMU to adjust one or more operating parameters of one or more of the cores of the processor in order to avoid potential negative consequences associated with the event, e.g., overheating, processor malfunction, etc. Additionally, in some embodiments when overflow of an accumulator has occurred, a communication may be sent to the PMU.

In embodiments, a GO command ("pull") may be issued from the PMU to telemetry monitors, e.g., to PMA and accumulators of a particular core. The PMU may issue the GO command to request cumulative telemetry data collected by the accumulators in the core. When the core receives the GO message, a "snapshot" of values of all of the accumulators may be taken, e.g., by the PMA, and sent to the PMU.

In some embodiments, each accumulator is to read data from its core at the data collection rate specified by Acc_Updata_Rate, e.g., to result in low jitter and low error. Upon receipt by the PMA of the GO command, the cumulative value in each accumulator may be sent to the PMU to be stored in a control register that corresponds to the core.

In embodiments, when a GO command is received by the PMA from the PMU, each accumulator may provide (e.g., "push") its contents to the PMU via the PMA, e.g., when the PMA receives the GO command it takes a snapshot of all the accumulators, to be stored as telemetry data in temporary registers. The PMA may send the telemetry data to CRs within the PMU.

In an embodiment, the PMU may have one CR per core. The CR may include a field to carry telemetry identification (ID) information. After the telemetry data is reported to the PMU, local counters may continue to collect data to be sent to their respective accumulators. In some embodiments, the accumulators may be reset after the stored data has been reported to the PMU. In other embodiments, one or more accumulators may continue to tally events without a reset of the corresponding value stored.

In the PMU, responsive to a particular accumulator having reached a critical value, an indicator may be set (e.g., a bit) in the Tele_Vir_Wire CR. Responsive to the indicator, the PMU may issue a command to read the particular accumulator, or the PMU may ignore the indicator.

The PMU may run a "loop" on all cores, e.g., read corresponding telemetry data from each core, e.g., consecutively. A pull period (pull time interval) between reads of the cumulative telemetry data from a given core to the PMU may be, e.g., one millisecond, or greater than one millisecond. In contrast, the local counters may provide parameter values to their respective accumulators at a much higher frequency, e.g., the time interval between parameter value measurements by local counters may be on the order of 10 μsec.

After the GO command is issued, each core is to send a message with telemetry data collected from all accumulators of the core (e.g., snapshot). After each core sends its telemetry data, the PMU may receive an acknowledge (ACK) from the core. When all ACKs are in place, the PMU can begin to analyze the data.

Because the PMU determines when the telemetry data is to be received, the PMU can request data from each core only after a current core is finished with data collection. As a result, data traffic congestion via, e.g., a sideband route (e.g., OSF sideband) may be avoided without loss of accuracy, since the data is collected by the local counters at a rapid rate.

The PMU may call for the telemetry data (e.g., "pull command") in and may use the collected telemetry data to determine power-related parameters, e.g., voltage to the core, clock frequency of the core, operating voltage and clock frequency of other cores, etc. The pull command may be generated on a periodic basis, e.g., after a pull time interval ("pull period") expires, or on an as-needed basis determined by the PMU.

The pull period in a processor configuration in which accumulators located in a core may exceed a push period of data delivery for a configuration in which the accumulators are located in the PMU. That is, with the accumulators in the core, data is to be sent to the PMU less frequently than when the accumulators are in the PMU, and consequently reduction of traffic congestion in a sideband path may result from location of the accumulators in the cores.

In embodiments in which the accumulators are located in the core, each core may additionally include a push mechanism to trigger a push of telemetry data to the PMU, e.g., when a count in a particular accumulator exceeds a threshold value. For example, a count of high dI/dt events may exceed a corresponding threshold value and can trigger a push of the corresponding telemetry data from a dI/dt event accumulator to the PMU, independent of any pull commands that might otherwise be generated by the PMU. A push of the dI/dt data may enable the PMU to quickly react to, e.g., an imminent rise of temperature of the core due a series of current spikes.

Figure 16:
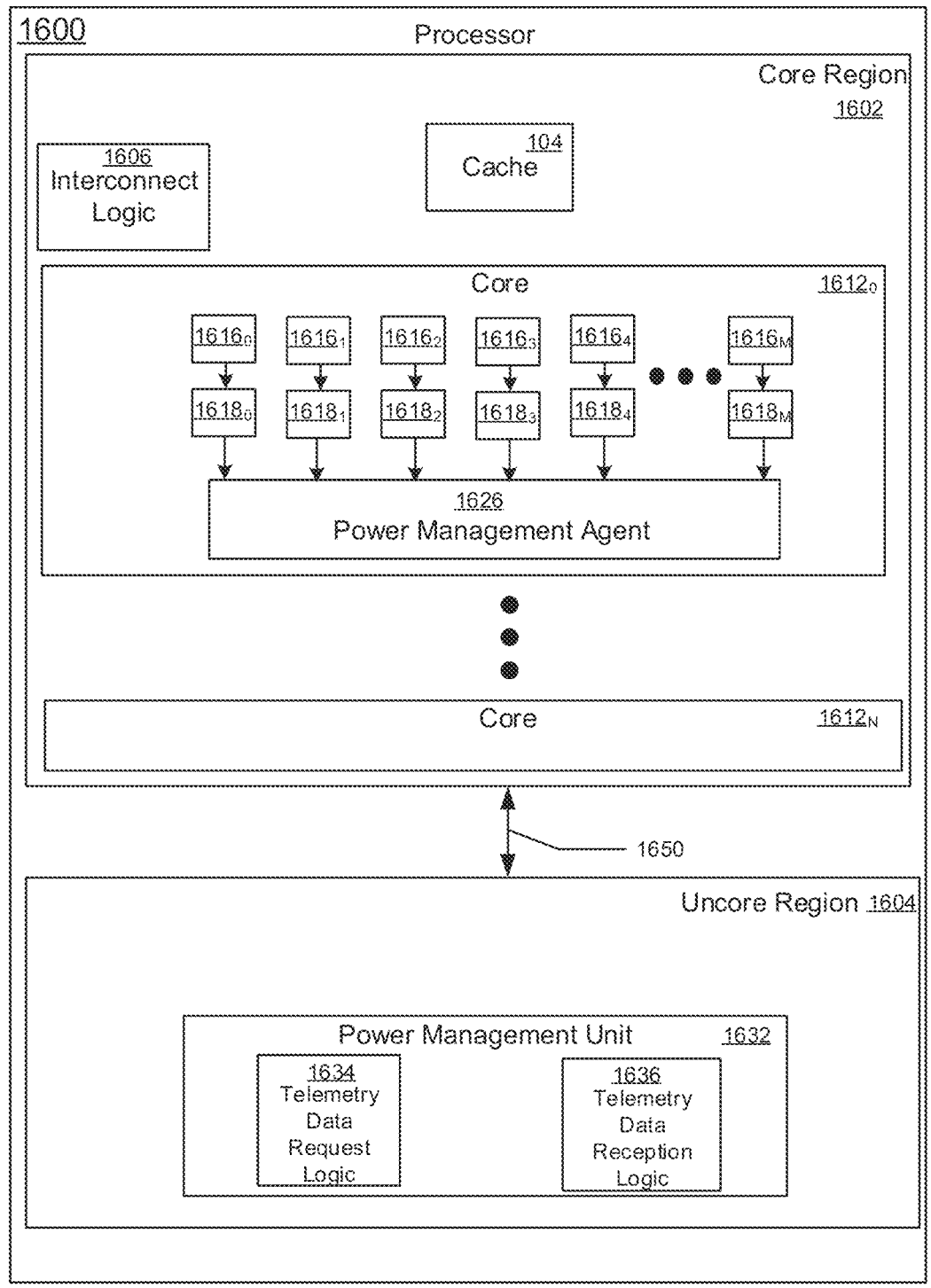
FIG. 16 is a block diagram of a processor, according to an embodiment of the present invention.

FIG. 16 is a block diagram of a processor in accordance with an embodiment of the present invention. Processor 1600 includes a core region 1602, an uncore region 1604, and a sideband path (also channel herein) 1650, e.g., a portion of on-chip system fabric (OSF) that is to connect the core region 1602 and the uncore region 1604.

The core region 1602 includes a cache memory 1604, interconnect logic 1606, a plurality of cores 1612$_0$-1612$_N$ and may include additional components (not shown).

The uncore region 1604 includes a power management unit (PMU) 1632 that is to include telemetry data request logic 1634 and telemetry data reception logic 1636, and may include additional components (not shown). The uncore region 1604 may include other components (not shown).

As an exemplary core, core 1612$_0$ includes a plurality of local counters 1616$_i$, (i=1 to M) and a corresponding accumulator 1618$_i$ for each local counter 1616$_i$. Contents (e.g., a snapshot of collected data) of each accumulator 1618$_i$ may be provided to a power management agent (PMA) 1626, e.g., upon request by the PMA 1626.

In operation, each local counter 1616$_i$ may generate an indication (e.g., a count) in response to a particular core event type (e.g. dI/dt spike, memory load, memory store, etc.) and the local counter 1616$_i$ may send the indication to the corresponding accumulator 1618$_i$. Each accumulator 1618$_i$ is to store a cumulative sum of indications received from the corresponding local counter 1616$_i$.

The telemetry data request logic 1634 may generate a pull command to be sent to a core 1612$_i$, e.g., via a sideband path 1650. Responsive to the pull command, the PMA 1626 may retrieve and transmit contents of each of the accumulators 1618$_i$ to the telemetry data reception logic 1636 via the sideband path 1650. In embodiments, the telemetry data request logic 1634 may generate a pull command to each core 1612$_i$ independently, e.g., consecutively, so as to avoid traffic congestion of data to be transported via the sideband path 1650 from the PMA 1628 to the PMU 1632.

The telemetry data reception logic 1636 may receive the telemetry data from the accumulators 1618$_i$ via the PMA 1626. Based upon the received telemetry data the PMU 1632 may determine whether to cause adjustment of one or more power parameters associated with the core region 1602, e.g., core voltage, clock frequency, etc. associated with the core 1612$_0$. For example, the PMU 1632 may adjust core voltage to be provided to one or more of the cores 1612$_i$ via an integrated voltage regulator (not shown). Alternatively or additionally, the PMU 1632 may cause an adjustment of a clock frequency of one or more of the cores 1612$_i$ via e.g., a PMA of the core 1612$_i$, or may cause another power parameter of one or more cores to be changed responsive to analysis by the telemetry data reception logic 1636, of the telemetry data provided by each core 1612$_i$.

Figure 17:
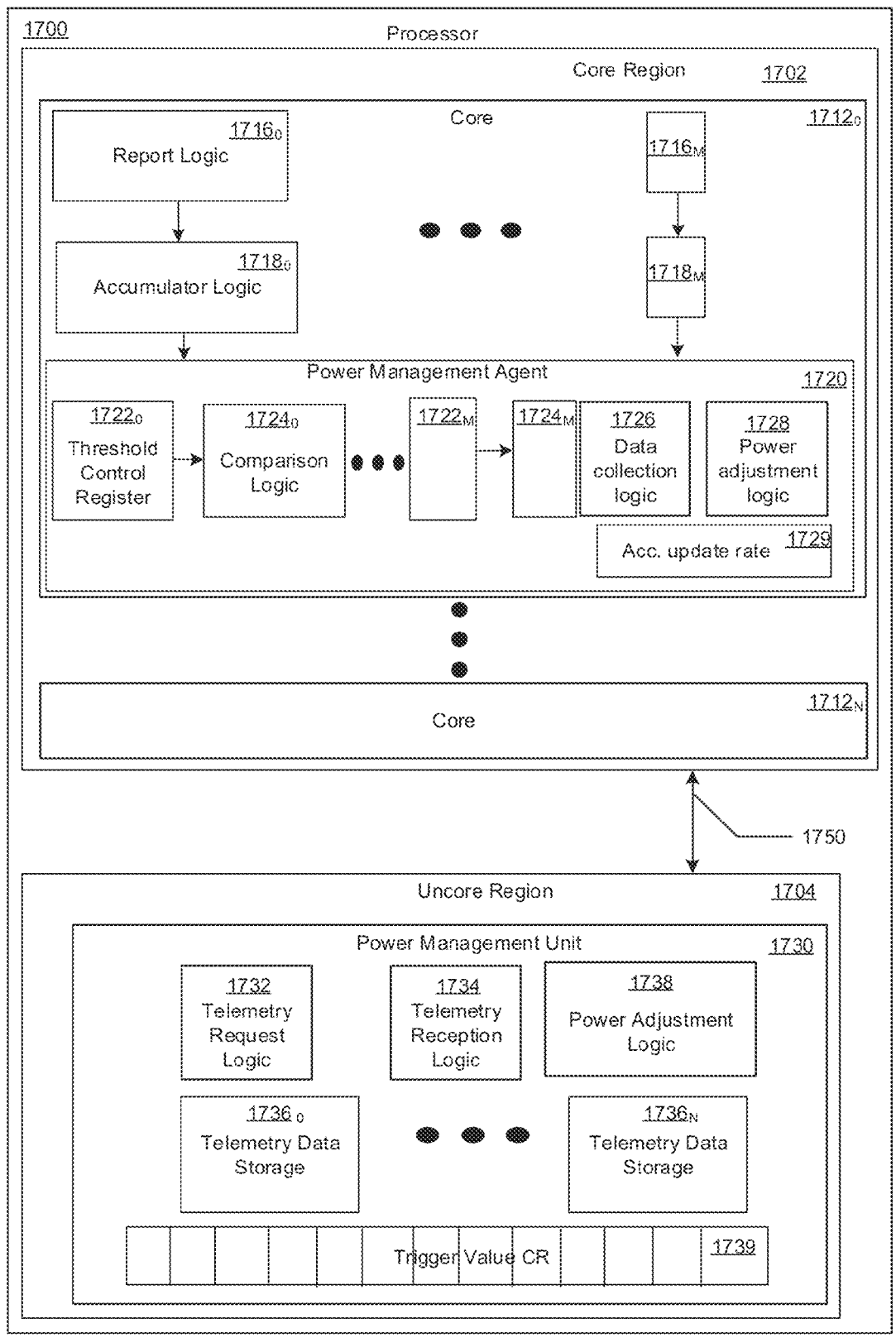
FIG. 17 is a block diagram of a processor, according to another embodiment of the present invention.

FIG. 17 is a block diagram of a processor 1700, according to another embodiment of the present invention. The processor 1700 includes a core region 1702 that includes a plurality of cores 1712$_i$ (i=1, N), an uncore region 1704 that includes a power management unit (PMU) 1730, and a sideband path 1750 (e.g., a portion of on-chip system fabric (OSF) to couple the cores 1712$_i$ to the PMU 1730. Other logics and/or storage registers (not shown) may also be included in the processor 1700.

In operation, one or more of the cores 1712$_i$ may include a plurality of report logics (e.g., local counters) 1716$_i$ (i=1, M) and a corresponding plurality of accumulator logics 1718$_i$. Each report logic 1716$_i$ may provide to the corresponding accumulator logic 1718$_i$ during a given time period (e.g., once per each clock cycle), a telemetry value associated with a particular telemetry variable, e.g., an indication of whether an event has occurred (e.g., load, store, a dI/dt spike, floating point operation, etc.) or a count of instances of the event occurrence within the given time period. Each accumulator logic 1718$_i$ is to maintain a cumulative sum of the telemetry values received from its respective report logic 1716$_i$ during a pull time period ("pull interval") between consecutive pull commands to be received from the PMU 1730.

Upon receipt by the core 1712$_0$ of a pull command (e.g., via sideband path 1750, or via another path) data collection logic 1726 may collect ("take a snapshot" of) the telemetry data in the accumulator logics 1718$_i$ (i=1, M). The PMA 1720 may provide the collected telemetry data to the PMU 1730 via the sideband path 1750 responsive to the pull command.

The PMA 1720 may include threshold control registers $1722_i$ and comparison logic $1724_i$ (i=1, M) for each telemetry data type whose indications are summed by the corresponding accumulator logic $1718_i$. The comparison logic $1724_i$ may compare a current telemetry value stored in the accumulator $1718_i$ to a threshold value stored in the corresponding threshold control register $1722_i$ and if the current telemetry value exceeds the threshold value, the comparison logic $1724_i$ may push the current telemetry value to the PMU 1730 (e.g., via a "virtual wire") to be stored in trigger value CR 1739, which may warn the PMU 1730 that the telemetry value has "spiked," which may correlate to a power spike or imminent power spike. Power adjustment logic 1738 in the PMU 1730 may respond to the pushed telemetry data, e.g., by adjustment of one or more operating parameters of the core $1712_0$, e.g., adjustment of operating voltage, clock frequency, duty cycle, throttling of throughput, etc.

The PMA 1720 may also include an accumulator update rate control register 1729 that may be set, e.g., by the PMU 1730, or by an operating system (not shown), or by another data management source. The accumulator update rate control register 1729 may store, e.g., a data collection rate at which the report logics $1716_i$ are to provide telemetry values to their respective accumulators $1718_i$.

The PMA 1720 may also include power adjustment logic 1728 that can adjust one or more operation parameters, e.g., clock frequency of the core $1712_0$, based upon input received from the PMU 1730.

The PMU 1730 may include telemetry data request logic 1732 to generate pull commands upon decision by the PMU 1730. The pull commands may be generated periodically or may be generated aperiodically. The PMU 1730 may also include telemetry data reception logic 1734 to store the telemetry data received from each core into corresponding telemetry data storage $1736_i$. Each telemetry data storage $1736_i$ may include an identification to identify each particular type of telemetry data received from a particular core. Additionally, the PMU 1730 may include trigger value control registers 1739 to receive an indication that a threshold has been exceeded, as determined in the PMA 1720, e.g., by comparison logic $1724_i$. The PMU 1730 may respond to an indication placed in the trigger value control registers 1739, or may choose to ignore the indication. For example, the PMU 1730 may respond by alerting power adjustment logic 1738 to issue a command to adjust one or more operational parameters of one or more of the cores $1712_i$.

The power adjustment logic 1738 may analyze the telemetry data stored in the telemetry data storages $1736_i$, and may determine whether to adjust one or more operational parameters of the processor 1700, based at least in part on the values stored in telemetry data storages $1736_i$.

Upon issuance of a pull command and after telemetry data values of a particular core $1712i$ have been reported to the PMU 1730, the telemetry data values stored in each accumulator logic of the particular core (e.g., accumulator logics $1718_i$ of core $1712_0$) may be reset, and a next data collection period may begin.

In processor 1700, the accumulator logics $1718_i$ are located within each core $1712_i$, and the pull time interval between generation of pull commands may be longer than, e.g., a push time period between data push events for a system in which all accumulators are located in the PMU 1730. Placement of the accumulators in the core $1712_i$ may result in a reduced frequency of transmission of telemetry data from each core to the PMU 1730, and can reduce congestion in the interconnect 1750 without loss of access to the data by the PMU 1730.

After each core $1712_i$ has sent its telemetry data to the PMU 1730, each core $1712_i$ also may send an acknowledgment to the PMU 1740 as an indication that the telemetry data has been sent. When acknowledgments have been received from all cores $1712_i$, analysis of the received telemetry data can commence.

Figure 18:
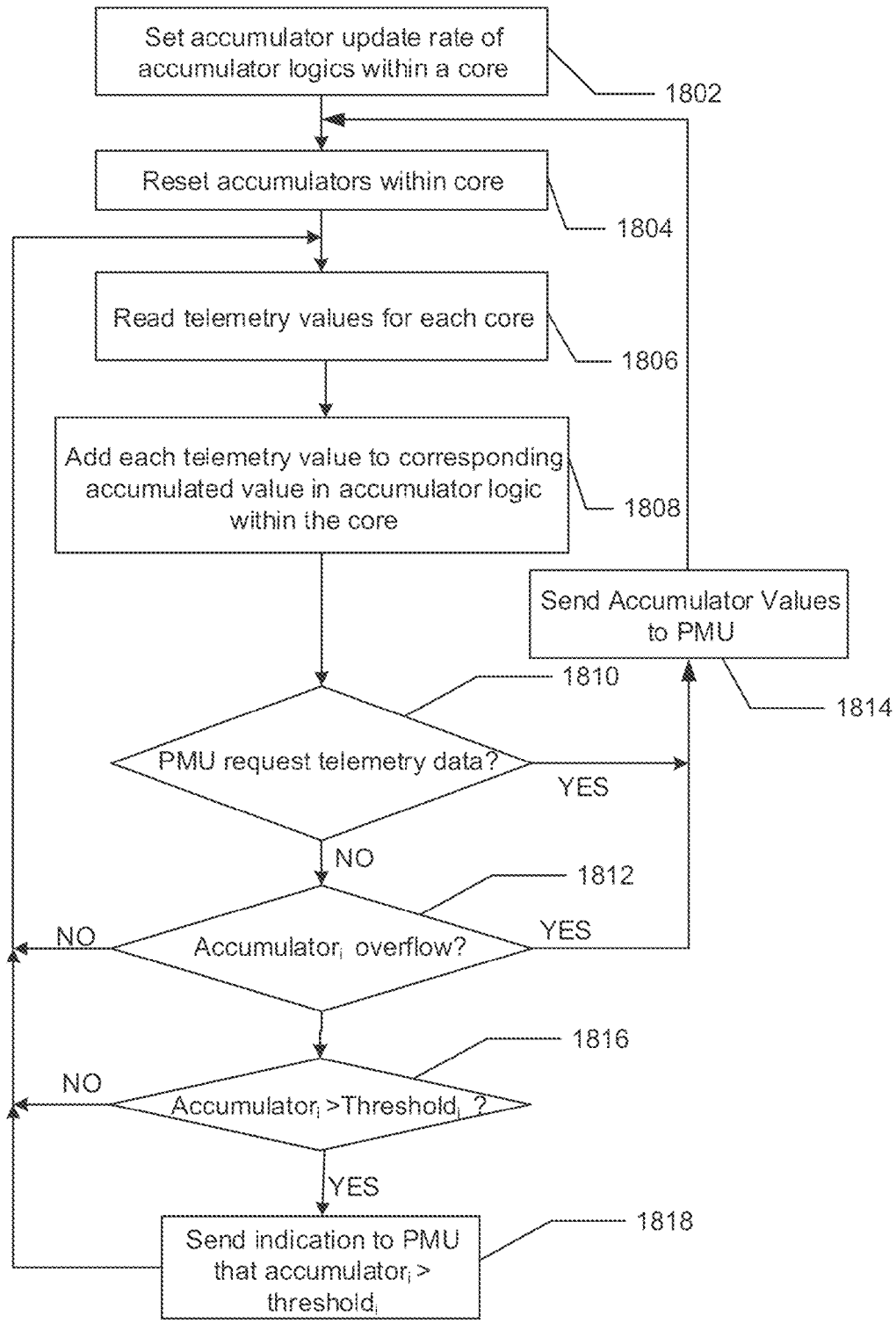
FIG. 18 is a flow diagram of a method, according to an embodiment of the present invention.

FIG. 18 is a flow diagram of a method 1800, according to an embodiment of the present invention. At block 1802 a rate of accumulator update is set, e.g., time period between updates of one or more accumulators (e.g., data received from a local counter) of a core of a multi-core processor. For example, the rate of accumulator update may be determined by a PMU of the processor. Each accumulator is to tally a corresponding telemetry value of the core in which the accumulator is placed. Each core includes the one or more accumulators that tally corresponding telemetry values of a respective telemetry parameter for that core.

Continuing to block 1804, accumulators are reset at a beginning of a pull time period, e.g., after a previous pull command from the PMU has been responded to by providing the accumulator values stored in each accumulator of a core.

Advancing to block 1806, each telemetry value may be read by in a corresponding local counter in the core. Moving to block 1808, each telemetry value may be added to an accumulated value in the corresponding accumulator within the core.

Proceeding to block 1810, if the PMU issues a pull command, e.g., request for telemetry data stored in the accumulators of a particular core, continuing to block 1814 the accumulator values of the particular core are sent to the PMU, e.g., via a sideband path, and returning to block 1804, the accumulators within the core are to be reset. If, at decision diamond 1810, the PMU has not issued a pull command, continuing to decision block 1812, if an accumulator has overflowed, proceeding to block 1814 the accumulator values in each of the accumulators within the core are to be sent to the PMU, and returning to block 1804, the accumulators within the core are to be reset.

If no accumulator has overflowed, continuing to decision diamond 1816, if none of the accumulators stores an accumulator value that exceeds a corresponding threshold$_i$ returning to block 1806 telemetry values are read and stored in respective accumulators at block 1808 periodically at the accumulator update rate set in block 1802. If, at decision diamond 1816, an accumulator value of accumulator$_i$ has exceeded its corresponding threshold$_i$, (e.g., determined via a comparison performed within a power management agent (PMA)), proceeding to block 1818 an indication that accumulator$_i$ has exceeded its threshold$_i$ is initiated from the core to the PMU. Returning to block 1806 telemetry values are read and stored in respective accumulators at block 1808 periodically at the accumulator update rate set in block 1802.

In embodiments, each core may receive a respective pull command independently. In embodiments, the pull commands are issued consecutively, so as to reduce congestion in the sideband path that transports the accumulator values from each core to the PMU.

Figure 19:
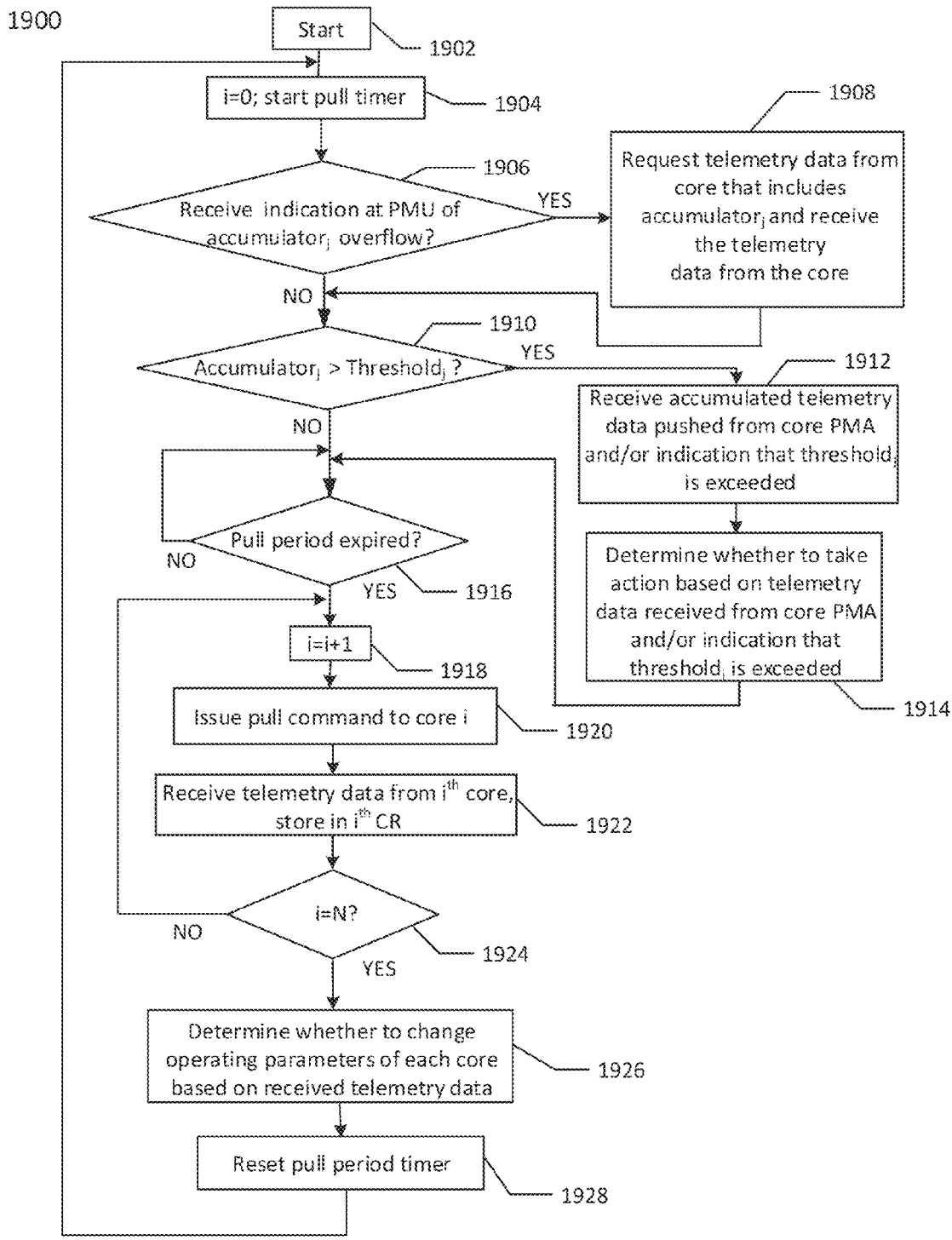
FIG. 19 is a flow diagram of a method, according to another embodiment of the present invention.

FIG. 19 is a flow diagram of a method, according to another embodiment of the present invention. Method 1900 starts at block 1902. Continuing to block 1904, an index i is set equal to zero, and a pull timer in a PMU of a multi-core processor is started to time a pull period, e.g., time interval between issuance of pull commands. Advancing to decision diamond 1906, if an indication of overflow of an accumulator within a core of the processor is received at a PMU of the processor, moving to block 1908 the PMU is to request telemetry data from the core and in response the PMU is to receive the telemetry data of the accumulators in the core. A PMA within the core is to reset the accumulators after the telemetry data has been transmitted to the PMU.

Proceeding to block 1910, if an accumulator value of a core exceeds a threshold (as determined by the PMA of the core), continuing to block 1912 the PMU is to receive an indication that the threshold has been exceeded, and/or the accumulated telemetry data pushed from the PMA of the core. Advancing to block 1914, the PMU is to determine whether to take an action, e.g., power management action, based on based on telemetry data received and/or based on the indication the threshold has been exceeded. For example, an indication that the accumulator value exceeds the corresponding threshold may indicate that a thermal condition is imminent, and the PMU may determine to reduce activity level of the core, e.g., via reduction of instruction throughput (e.g., throttling), reduction of clock speed, reduction of operating voltage, etc. or a combination thereof.

Moving to block 1916, if the pull period is not expired, the PMU waits until the pull period is expired. Upon expiry of the pull period, proceeding to block 1918 the index is incremented, and continuing to block 1920 a pull command is issued to an $i^{th}$ core of the processor. Proceeding to block 1922, telemetry data is received from the $i^{th}$ core responsive to the pull command and the received telemetry data is stored in an $i^{th}$ control register (CR) corresponding to the $i^{th}$ core, within the PMU.

Continuing to decision diamond 1924, if i has not reached a value N that corresponds to all cores having been issued a respective pull command (e.g., the processor includes a total of N cores), returning to block 1918, the index i is incremented and a next pull command is issued to the $i^{th}$ core. If at decision diamond i=N, advancing to block 1926, the PMU is to determine whether to change any operating parameter(s) of each core based on the received telemetry data. Changes may include adjustment of any of operating voltage (Vcc), clock frequency, duty cycle, throttling, etc. and combinations thereof.

Moving to block 1928, the pull period timer is reset, and returning to block 1904 the method is repeated. Within each core, the accumulators may be reset prior to a start of each pull period, e.g., start of the pull timer.

Thus, in embodiments, the PMU is to control when telemetry data is received via issuance of pull commands. Within each core, telemetry data may be collected and tallied at a high data collection rate by accumulators in the core and may subsequently be received by the PMU at a data reception rate, e.g., lower than the data collection rate, the data reception rate determined at least in part by the pull period. A low data reception rate may result in reduced data transport congestion from the cores to the PMU via a sideband path.

Additional embodiments are described below.

In a first embodiment, a processor includes a plurality of cores including a first core. The first core includes a first plurality of accumulator logics, each accumulator logic of the first plurality of accumulator logics to store respective first core telemetry data. The first core also includes a power management unit (PMU) to request first core telemetry data from the first core and in response to receive at least one first core telemetry data stored in a corresponding accumulator logic of the first plurality of accumulator logics.

A second embodiment includes elements of the $1^{st}$ embodiment, where a second core of the plurality of cores includes a second plurality of accumulator logics, each accumulator logic of the second plurality of accumulator logics to store respective second core telemetry data that includes a sum of values of a corresponding second core telemetry parameter, and where the PMU is to request second core telemetry data from the second core and in response is to receive at least one second core telemetry data stored in a corresponding accumulator logic of the second plurality of accumulator logics.

A $3^{rd}$ embodiment includes elements of the $2^{nd}$ embodiment. Additionally, subsequent to receipt of the at least one first core telemetry data of the first core the PMU is to request the second core telemetry data and receive the at least one second core telemetry data from the second core.

A $4^{th}$ embodiment includes elements of the $1^{st}$ embodiment. Additionally, the first core includes a power management agent (PMA) and a control storage corresponding to a first accumulator logic of the first core, the control storage to store a threshold value. The PMA is to determine whether the first core telemetry data stored in the first accumulator logic exceeds the threshold value stored in the control storage and if so, to notify the PMU.

A $5^{th}$ embodiment includes elements of the $1^{st}$ embodiment. Additionally, the first core telemetry data stored in a first accumulator logic corresponds to an accrued count of instances that the first core has been in a reduced activity state during a first time period.

A $6^{th}$ embodiment includes elements of the $1^{st}$ embodiment, further comprising a sideband path to couple the first core and the PMU, wherein the at least one first core telemetry data is to be received by the PMU via the sideband path.

A $7^{th}$ embodiment includes elements of any one of the $1^{st}$ to the $6^{th}$ embodiments, where the PMU is to determine, based at least in part on the first core telemetry data received, at least one of an operating voltage and a clock frequency at which to operate the first core.

An $8^{th}$ embodiment includes elements of any one of the $1^{st}$ to the $6^{th}$ embodiments. The processor of any one of claims 1 to 6, wherein the first core includes a power management agent (PMA) to notify the PMU when a particular accumulator logic of the first plurality of accumulator logics is in an overflow condition.

A $9^{th}$ embodiment is a processor that includes a plurality of cores including a first core that includes first accumulator logic to count, at a first data collection rate, first telemetry data associated with the first core. The processor also includes a power management unit (PMU) to periodically issue a first core request to the first core at a request rate, and responsive to the first core request, to receive the first telemetry data stored in the first accumulator logic, wherein the first data collection rate is to exceed the request rate.

A $10^{th}$ embodiment includes elements of the $9^{th}$ embodiment. The plurality of cores includes a second core that includes a second accumulator logic to store second telemetry data associated with the second core, where responsive to a second core request issued by the PMU to the second core, the PMU is to receive the second telemetry data stored in the second accumulator logic.

An $11^{th}$ embodiment includes elements of the $10^{th}$ embodiment. Additionally, the first telemetry data and the second telemetry data are to be received consecutively by the PMU via a sideband path responsive to consecutive issuance of the first core request and the second core request.

A 12th embodiment includes elements of the 9th embodiment.

Additionally, the first core includes a first control register to store a threshold value, and the first core includes a first power management agent (PMA) to notify the PMU when the first telemetry data exceeds the threshold value.

A 13th embodiment includes elements of the 9th embodiment, where first telemetry data corresponds to a count of instances that the first core has been in a reduced activity state during a time period between the issuance of successive first core requests.

A 14th embodiment includes elements of the 9th embodiment. First telemetry data corresponds to a count of instances that a rate of current flow (dI/dt) in the first core exceeds a first threshold during a time period between issuance of successive first core requests.

A 15th embodiment includes elements of the 9th embodiment, where the first core includes a power management agent (PMA), and where responsive to the first accumulator logic being in an overflow condition the PMA is to send an overflow indicator to the PMU.

A 16th embodiment includes elements of the any one of the 9th to the 15th embodiments, where responsive to receipt of the first telemetry data, the PMU is to determine whether to adjust a power usage parameter associated with the first core.

A 17th embodiment includes elements of any one of the 9th to the 15th embodiments, and further includes a sideband path, wherein the first telemetry data is to be received by the PMU via the sideband path.

An 18th embodiment is a machine-readable medium having stored thereon data, which if used by at least one machine, cause the at least one machine to fabricate at least one integrated circuit to perform a method that includes storing in a first core of a processor a plurality of first core cumulative telemetry values, where each first core cumulative telemetry value is to be stored in a corresponding accumulator logic, and where each first core cumulative telemetry value includes a sum of values of a corresponding first core telemetry parameter measured over a summation time period. The method further includes responsive to a first core first request to be received by the first core from a power management unit (PMU) of the processor upon expiry of the summation time period, sending from the first core to the PMU first core telemetry information corresponding to at least one of the first core cumulative telemetry values.

A 19th embodiment includes elements of the 18th embodiment, where the sum of values of a particular first core telemetry parameter is to be determined from at least two values measured during the summation time period.

A 20th embodiment includes elements of the 18th embodiment, where the method further includes storing in a second core of the processor a plurality of second core cumulative telemetry values, where each second core cumulative telemetry value is to be stored in a corresponding accumulator logic, where each second core cumulative telemetry value includes a sum of values of a corresponding second core telemetry parameter measured over the summation time period. The method includes responsive to a second core first request to be received by the second core from the PMU upon expiry of the summation time period, sending from the second core to the PMU second core telemetry information corresponding to at least one of the second core cumulative telemetry values.

A 21st embodiment includes elements of the 18th embodiment. The method further includes notifying the PMU when one of the first core cumulative telemetry values exceeds a threshold value.

A 22nd embodiment includes elements of any one of the 18th to the 21st embodiment. The method further includes sending the first core telemetry information from the first core to the PMU via a sideband path of the processor.

A 23rd embodiment is a method that includes storing in a first core of a processor a plurality of cumulative telemetry values, wherein each cumulative telemetry value is to be stored in a corresponding accumulator logic, wherein each cumulative telemetry value includes a sum of values of a corresponding telemetry parameter measured over a summation time period. The method further includes responsive to a request received by the first core from a power management unit (PMU) of the processor upon expiry of the summation time period, sending from the first core to the PMU telemetry information corresponding to at least one of the cumulative telemetry values.

A 24th embodiment includes elements of the 23rd embodiment, where the sum of values is to be determined from at least two successive values measured during the time period.

A 25th embodiment includes elements of the 23rd embodiment, and further includes notifying the PMU when one of the cumulative telemetry values exceeds a threshold value.

A 26th embodiment includes elements of any one of embodiments 23 to 25, and further includes sending the first core telemetry information from the first core to the PMU via a sideband path of the processor.

A 27th embodiment includes apparatus that includes means for performing the method of any one of embodiments 23-25.

A 28th embodiment is a method that includes determining by a power management unit (PMU) of a processor that a pull time period has elapsed, the pull time period to begin at a start time, and in response, issuing a first core pull command to a first core of the processor. The method also includes responsive to issuing the first core pull command, receiving at the PMU from the first core first core telemetry information that includes a first core cumulative telemetry value, where the first core cumulative telemetry value corresponds to a summation of a plurality of measurements of a telemetry parameter of the first core, wherein each measurement is to be measured at a corresponding distinct time during the pull time period.

A 29th embodiment includes elements of the 28th embodiment, and further includes receiving the first core telemetry information at the PMU from the first core via a sideband path of the processor.

A 30th embodiment includes elements of the 29th embodiment, further comprising after issuing the first core pull command, issuing a second core pull command to a second core of the processor and in response receiving at the PMU from the second core, second core telemetry information that includes a second core cumulative telemetry value, wherein the second core cumulative telemetry value corresponds to a summation of a plurality of measurements of a telemetry parameter of the second core, wherein each measurement is to be measured at a corresponding distinct time during the pull time period.

A 31st embodiment includes the method of any one of embodiments 28 to 30, and further includes determining whether to change at least one operating parameter of the first core based at least in part on the first core cumulative telemetry value.

A 32$^{nd}$ embodiment is an apparatus that includes means for performing the method of any one of embodiments 28 to 30.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores including a first core, wherein the first core includes a first plurality of accumulator logics, each accumulator logic of the first plurality of accumulator logics to store corresponding first core telemetry data; and
a power management unit (PMU) to request first core telemetry data from the first core and in response to the request for the first core telemetry data to receive at least one first core telemetry data stored in a corresponding accumulator logic of the first plurality of accumulator logics.

2. The processor of claim 1, wherein a second core of the plurality of cores includes a second plurality of accumulator logics, each accumulator logic of the second plurality of accumulator logics to store corresponding second core telemetry data comprising a sum of values of a corresponding second core telemetry parameter, and wherein the PMU is to request second core telemetry data from the second core and in response to the request for the second core telemetry data is to receive at least one second core telemetry data stored in a corresponding accumulator logic of the second plurality of accumulator logics.

3. The processor of claim 2, wherein subsequent to receipt of the at least one first core telemetry data of the first core the PMU is to request the second core telemetry data and receive the at least one second core telemetry data from the second core, to reduce traffic on a sideband interconnect.

4. The processor of claim 1, wherein the first core includes a power management agent (PMA) and a control storage corresponding to a first accumulator logic of the first core, the control storage to store a threshold value, and wherein the PMA is to determine whether the first core telemetry data stored in the first accumulator logic exceeds the threshold value stored in the control storage and if so, to notify the PMU.

5. The processor of claim 1, wherein the first core telemetry data stored in a first accumulator logic corresponds to an accrued count of instances that the first core has been in a reduced activity state during a first time period.

6. The processor of claim 1, further comprising a sideband path to couple the first core and the PMU, wherein the at least one first core telemetry data is to be received by the PMU via the sideband path.

7. The processor of claim 1, wherein the PMU is to determine, based at least in part on the at least one first core telemetry data received, at least one of an operating voltage and a clock frequency at which to operate the first core.

8. The processor of claim 1, wherein the first core includes a power management agent (PMA) to notify the PMU when a first accumulator logic of the first plurality of accumulator logics is in an overflow condition, the PMA to operate in a separate power domain than a power domain of the first core.

9. A processor comprising:
a plurality of cores including a first core that includes first accumulator logic to count, at a first data collection rate, first telemetry data associated with the first core; and
a power management unit (PMU) to periodically issue a first core request to the first core at a request rate, and responsive to the first core request, to receive the first telemetry data stored in the first accumulator logic, wherein the first data collection rate is to exceed the request rate.

10. The processor of claim 9, wherein the plurality of cores includes a second core that includes second accumulator logic to store second telemetry data associated with the second core, wherein responsive to a second core request issued by the PMU to the second core, the PMU is to receive the second telemetry data stored in the second accumulator logic.

11. The processor of claim 10, wherein the first telemetry data and the second telemetry data are to be received consecutively by the PMU via a sideband path responsive to consecutive issuance of the first core request and the second core request.

12. The processor of claim 9, wherein the first core includes a first control register to store a threshold value, and wherein the first core includes a first power management agent (PMA) to notify the PMU when the first telemetry data exceeds the threshold value.

13. The processor of claim 9, wherein the first telemetry data corresponds to a count of instances that the first core has been in a reduced activity state during a time period between issuance of successive first core requests.

14. The processor of claim 9, wherein the first telemetry data corresponds to a count of instances that a rate of current flow (dI/dt) in the first core exceeds a first threshold during a time period between issuance of successive first core requests.

15. The processor of claim 9, wherein the first core includes a power management agent (PMA), wherein responsive to the first accumulator logic being in an overflow condition the PMA is to send an overflow indicator to the PMU.

16. The processor of claim 9, wherein responsive to receipt of the first telemetry data, the PMU is to determine whether to adjust a power usage parameter associated with the first core.

17. The processor of claim 9, further comprising a sideband path, wherein the first telemetry data is to be received by the PMU via the sideband path.

18. A non-transitory machine-readable medium having stored thereon data, which if used by at least one machine, cause the at least one machine to fabricate at least one integrated circuit to perform a method comprising:

storing in a first core of a processor a plurality of cumulative telemetry values, wherein each cumulative telemetry value is to be stored in a corresponding accumulator logic, wherein each cumulative telemetry value includes a sum of values of a corresponding telemetry parameter measured over a summation time period;

responsive to a request to be received by the first core from a power management unit (PMU) of the processor upon expiry of the summation time period, sending from the first core to the PMU telemetry information corresponding to at least one of the cumulative telemetry values.

19. The non-transitory machine-readable medium of claim 18, wherein the sum of values is to be determined from at least two values measured during the summation time period.

20. The non-transitory machine-readable medium of claim 18, wherein the method further comprises sending the telemetry information from the first core to the PMU via a sideband path of the processor.

* * * * *